March 29, 1955     K. WESTINGER ET AL     2,705,106
CALCULATING MACHINES
Filed Dec. 4, 1950                                 2 Sheets-Sheet 1

INVENTORS:
Karl Westinger, Otto Hirt and
Ernst Altenburger
BY
Michael S. Striker
agt.

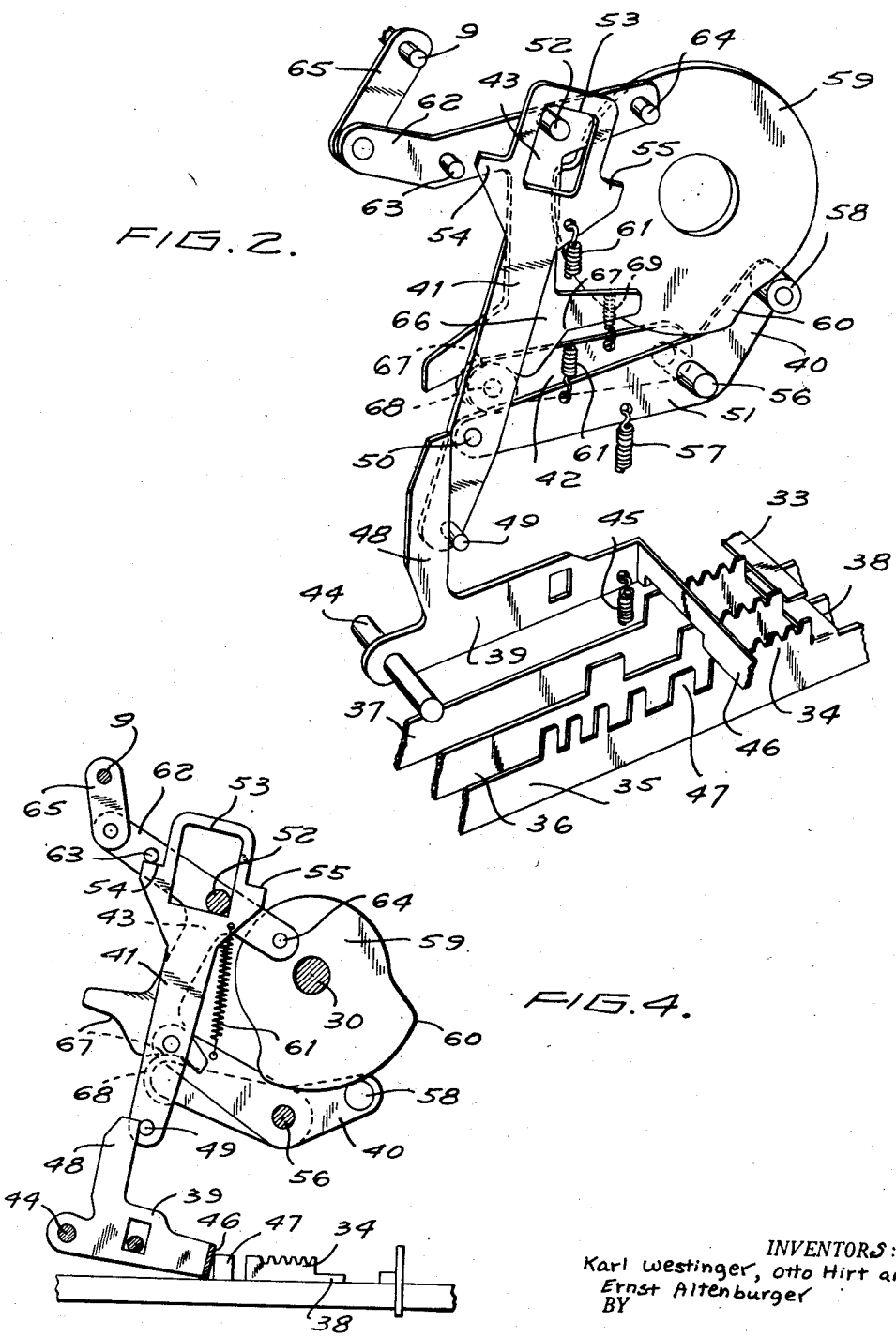

United States Patent Office 2,705,106
Patented Mar. 29, 1955

2,705,106

CALCULATING MACHINES

Karl Westinger, Ernst Altenburger, and Otto Hirt, Oberndorf on the Neckar, Wurttemberg, Germany, assignors to Olympia Werke West G. m. b. H., Wilhelmshaven, Germany, a limited liability company of Germany Application December 4, 1950, Serial No. 198,956

Claims priority, application Germany December 7, 1949

11 Claims. (Cl. 235—60.2)

This invention relates to calculating machines broadly and to calculating business machines, including for instance ten-key adding machines, in particular.

It relates more specifically to the means connected with such machines for striking a balance.

When a balancing operation is carried out, i. e., during totalling and sub-totalling operations, the accumulator or register must be set for addition, if the value registered by the accumulator is positive, and for subtraction, if the value is negative, for otherwise not the actual total or sub-total would appear and be printed in the machine, but their complementary values.

Means have already been devised for preventing such wrong balancing from occurring, taking as a starting point the fact that a negative balance can be converted into a positive balance only by an addition, a positive balance into a negative balance only by subtraction. In modern calculating machines providing for calculating operations below zero, a ten's transfer accompanied by transfer of a fugitive "one" is carried out whenever a zero transit occurs in the calculating mechanism. Since at each zero transit a change of sign of the register value takes place, it is possible to provide a sensing member which functions whenever a fugitive "one" occurs and then indicates the sign of the value registered by the accumulator, its position being simply compared with the actual position of the register and if the position should not agree steps would have to be taken for obtaining agreement.

Means have for instance been provided for locking the total and the sub-total keys in the case of non-agreement and to unlock them only as soon as the register is carried into the correct position by an idle stroke.

Full keyboard machines have further become known in which the correct position of the accumulators is obtained during the balancing operation of the machine, i. e. without effecting an idle stroke, by providing a device which becomes operative during an operation involving a fugitive "one" and which coacts with a device influenced by the sign of the value registered by the accumulator. This device is however very intricate and composed of a great number of different parts which makes it very expensive and subject to failure.

One object of this invention is to provide a balancing mechanism for calculating business machines and particularly for ten-key adding machines, which is of very simple design and consists of a small number of parts only, thus being inexpensive and reliable in operation. In the device according to this invention the register, whenever it is not in a position corresponding to its value, is moved into the correct position by means of a mechanism actuated during each operation involving a fugitive "one" and being dependent on the sign of the register value.

The device according to this invention is preferably provided with an integral controlling member adjusting itself in direct dependency from the register in one direction, and when an operation involving a fugitive "one" occurs, in a different direction and which in doing so brings about a correct totalling or sub-totalling. This control member influences the totalling or sub-totalling operations directly or indirectly.

In a preferred form of this device the control member is arranged for a tilting movement in which it can assume different angular positions depending on the position of the register and is moved longitudinally, when an operation involving a fugitive "one" occurs, and will thus produce the correct totalling or sub-totalling by acting on an oscillating lever which preferably forms a stop for a transmitting member influencing the manually operated parts.

Owing to its simple design and its direct dependency on the position of the register, the new device can operate at high speed and is foolproof since it retains the parts influencing the manually operated adjusting members in the position required for correct totalling or sub-totalling, no matter whether a balancing operation is under way or not, no further time-consuming operations being required when a calculating operation is carried out.

Other objects and properties of a device according to this invention will appear from the description herebelow which refers to the drawings affixed to the specification and forming part thereof, in which there is illustrated an embodiment of our invention which is designed for incorporation in a ten-key adding machine.

In the drawings:

Fig. 2 is a similar view of that part of the balancing mechanism which brings about the adjustment of the register; and Figs. 3 and 4 are, respectively, similar views of the parts shown in Figs. 1 and 2, which they take when a subtraction is to be performed, the balance of the registered items remaining positive.

Figure 1:
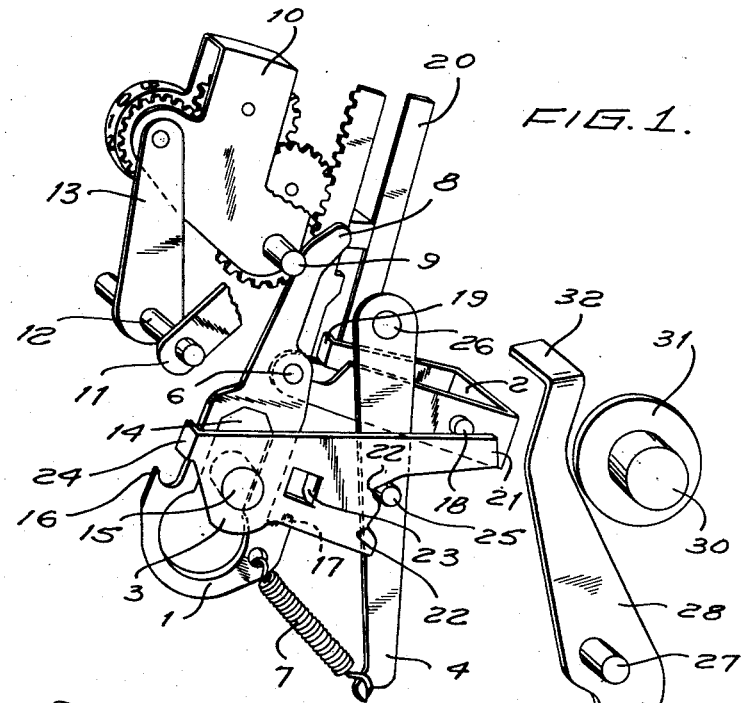
Fig. 1 is a perspective view of that part of the balancing mechanism of the machine which is influenced by the position of the register during an operation involving a fugitive "one"

As shown in the drawings, and more especially in Fig. 1, the balancing device consists of a balance-setting lever 1, termed hereinafter the first member, a horseshoe shaped control bail 2, termed hereinafter the second member, a balance-setting disc 3, termed hereinafter the third member, a locking lever 4 acting on the balance-setting disc 3 and a balance transmitting lever 5. The balance-setting lever 1 is a double armed lever pulled by means of a spring 7 attached to the bottom end of the locking lever 4 in counter-clockwise direction around a stud or pivotal connection 6 arranged at an arm extending in front of the setting bail 2. The upper portion or arm 8 of the setting lever 1 abuts against a stud or pin 9 on the accumulator 10 and is kept in contact with it through the action of the aforementioned spring 7, so that the balance-setting lever 1 tilts around the pivot pin 6, whenever the accumulator changes its position. The accumulator has a plurality of wheel pairs corresponding to different denominational orders, e. g. ten wheel pairs, only the pairs corresponding to the lowest order being shown in Fig. 1. With the register is operatively connected a coupling link 65, shown in Fig. 2, and described more in detail hereinafter. The register 10 is thrown in and out, in a manner not shown in detail, by way of a lever 11, the stationary axle 12 and a lever 13. In our copending application, Serial No. 198,955, filed December 4, 1950, we have described how the lever 11, denoted in the copending application by reference numeral 56, is connected with the device controlling the various operations, such as addition, subtraction, non-addition, etc. The bottom arm of the lever 1 has a slot or aperture 14 in which a stationary stud or pin 15 is located and is formed with two lateral hook-shaped extensions or projections 16 and 17.

The control bail 2 is rotatably mounted on a stationary pin 18 and a lip 19 of this bail extends into the longitudinal slot of the register rack 20 of the first digit. By means of the lip 19 the bail is lifted together with the balance-setting lever 1 whenever a ten's transfer causes the transfer of a fugitive "one." The disc 3 is rotatably mounted on the stationary pin 15 and is formed at its right hand side with a long arm 21, with an M-shaped double notch 22 and with a rearwardly extending tongue or abutment 23 and at its left hand end with another tongue or abutment 24. The double notch 22 and a stud 25, to be described more fully hereinafter, form a releasable means for locking the third member or balance setting disc 3 in its extreme position. The two tongues are so positioned above the hook-shaped extensions or projections 16 and 17 of the lever 1 that during its lifting movements they engage either with one or with the other of the hook-shaped extensions. The double notch 22 co-operates with the stud 25 of the locking lever 4 which is pulled by the spring 7 in clockwise direction about the stationary axle 26. The balance-transmission lever 5, which is rotatably mounted on a stationary pin 27 forms a double armed lever, the upper arm 28 of which is pulled in its initial position by a spring 29 against a disc 31 fixed on the machine shaft 30. A rearwardly bent extension 32 on this upper arm 28 will meet the arm 21 of the balancing disc 3 when the latter assumes its upper position. The lower arm of the balancing transmission lever 5, as shown more particularly in Fig. 2, faces with a forwardly bent part 33 the notched sections 34 of two slides 36 and 37 (termed hereinafter the first and second elements, respectively). Another slide 35 (termed hereinafter the third element) is provided with an integral bridge 38 which extends across the slides 36 and 37. Slide 35 which is the index slide, serves for the introduction of positive, negative or not to be added indexes. The slides 36 and 37 are termed the totalling and sub-totalling slides, respectively, and are used for taking the totals or sub-totals. The three slides are shifted towards the right through different travel units by the function keys (not shown), and, when so shifted, operate as more fully described in the copending application Serial No. 198,955, by means of their upwards extending teeth the sensing members which start the desired operations of the machine. The totalling slide 36 and the sub-totalling slide 37 always carry along the index slide 35 by means of the bridge or coupling means 38 when moved in longitudinal direction. All three slides can be stopped by the angular arm of the balance transmission lever 5 after having been displaced only a short distance, and in consequence of the ensuing position of the teeth now adjust the machine not for positive, but for negative totalling and sub-totalling. This adjustment is accomplished by the part of the balancing mechanism shown in Fig. 2.

The essential members of this latter device are a setting bail 39 having the shape of a crank lever, a reversing bar 41 which is lifted once during each stroke by a reversing lever 40 termed hereinafter the lever means, and a reversing member 43 which is locked in each position as later explained in detail by a lever 42. The setting bail 39 which, in a manner not shown in the drawings, is lifted at the end of each stroke and released at the beginning of a new stroke, is acted upon by a spring 45 which tends to tilt it around the stationary axle or pivot 44. The extension 46 of the bail 39 is cut out in such a way that it can engage only the index slide 35. According to the amount of longitudinal displacement of the slides 35, 36 or 37 the extension 46 may rest on the notched section 34 or on a tooth or projection 47 of the index slide 35 or it may enter the gaps or notches next to these projections. The setting bail 39 is formed on its left with an arm 48 which can meet a stud 49 mounted on the bottom end of the reversing bar 41. This bar is tiltably mounted on a stud 50 on the left hand arm 51 of the reversing lever 40 and its wider top end is formed with a rectangular slot or aperture 53 embracing a stationary axle or pivot 52 and with two lateral ears or abutments 54 and 55. The reversing lever 40 can rotate about a stationary axle 56 and, being acted upon by a spring 57 pulling it in counter-clockwise direction, will contact by means of a roller 58 mounted on its right hand arm a cam disc 59 which is fixed on the machine shaft 30. This shaft, when rotating, turns by means of the cam disc 59 and its cam 60 the reversing lever 40 in clockwise direction and this lever then lifts by means of the stud 50 the reversing bar 41, which is at the same time tilted in the same direction by means of a spring 61, the edge of the slot 53 now contacting the axle 52. The reversing member 43 which turns around the stationary axle 52 and is substantially formed like an H, carries on its top cross-arm 62 two studs or pins 63 and 64 which can engage the lateral abutments 54 and 55 of the reversing bar 41. The left end of arm 62 is connected with the stud 9 of the register 10 by a link 65. The bottom cross-arm 66 of the reversing member 43 is formed with an M-shaped double notch 67. This notch is engaged by the roller 68 of lever 42 which turns about the axle 56 and is acted upon by a spring 69 tending to turn it clockwise thereby causing the lever 42 to lock the reversing member 43 in each position.

The mechanism hereabove described operates as follows:

Assuming the last item introduced into the register 10 to have been positive and the total value of the register to be also positive, the parts of the mechanism take up the positions shown in Figs. 1 and 2, the top arm 8 of the balance setting member 1 resting against the stud 9 of the register 10 while the right hand extension of the arm 21 of the balance adjusting disc 3 is in its lower position in which it is locked in the top part of the notch 22 by the stud 25 of the lever 4. Since during an addition the extension 46 of the setting bail 39 rests on the left hand part of the notched section 34 of the index slide 35 it cannot turn the reversing bar 41 so that the left inner edge of its slot 53 is pulled against the stationary axle 52 by the spring 61. During every stroke of the machine, comprising a clockwise and a counter-clockwise rotation of the machine shaft 30 through a predetermined angle during an advance or return stroke, the reversing bar 41 is moved upwardly by the reversing lever 40 as its roller 58 moves on the cam 60 of the cam disc 59. However, the ear 54 will not engage the stud 63 of the reversing member 43, but pass it, while the ear 55 cannot meet the stud 64 which has already moved into its top position. Further adding operations do not bring about any change in this position of the parts so that the register 10 remains in its lower position in which the positive accumulating or registering disc is in engagement with the rack 20 of the machine as shown in Fig. 1. If now the function key (not shown) for a totalling operation is depressed, the totalling slide 36 is shifted through a predetermined distance towards the right, carrying along the index slide 35 by means of the bridge 38 and its notched section 34. The tooth 47 of the index slide 35 is so dimensioned that the projection 46 of the setting bail 39 comes to rest thereon, thus leaving the reversing bar 41 in the position which it occupied before. The balance transmission lever 5 which is free to oscillate is carried along by this shifting movement of the totalling slide 36. Thus when a totalling operation is performed, while the value registered by the accumulator is positive, the accumulator 10 remains in engagement with the addition pinion (not shown).

Figure 3:
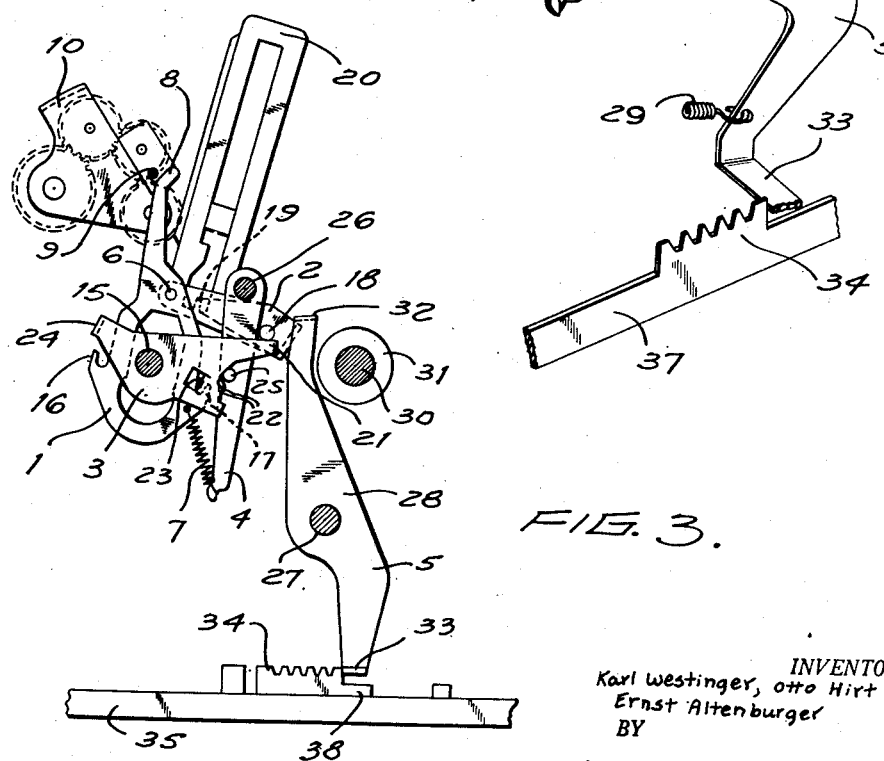

When the subtraction key (not shown) is pressed, the index slide 35 is so displaced (Figs. 3 and 4) that the projection 46 of the setting bail 39 can enter the gap at the left of tooth 47. In this movement its top arm 48 causes by means of the stud 49 the reversing bar 41 to oscillate counter-clockwise so that it now rests with the right hand inner edge of its slot 53 against the stationary axle 52. If the bar is then lifted by the reversing lever 40, the roller 58 of which runs on the cam disc 59, its left hand ear 54 meets the left hand stud 63 of the reversing member 43 whereby this latter is turned in clockwise direction and by means of the link 65 moves the register 10 into the negative counting position. The bar 41 then remains in this position, since the reversing member 43 is held in position by the roller 68 of the locking lever 42 engaging the right hand section of the double notch 67. Owing to this change in the position of the register 10 the upper arm 8 of the balance-setting lever 1 being always in contact with the stud 9 turns through a small angle towards the left under the action of the spring 7. In this movement its right hand hook-shaped projection 17 gets underneath the tongue 23 of the balance-setting disc 3. However, this change is not accompanied by any effect unless the subtraction has reduced the register value below zero. For in this case no fugitive "one" has been introduced and the control bail 2 has remained in the position shown in Fig. 1. Consequently, the balance-setting disc 3 has also retained its position. If now the total or sub-total shall be ascertained, the totalling slide 36 or the sub-totalling slide 37 without being hindered by the freely oscillating balance transmitting lever 5 is shifted to the right to such an extent that the projection 46 of the setting bail 39 meets the tooth 47 of the index slide 35 which has been carried along by the slide 37. The reversing bar 41 follows it under the action of spring 61 and thus once more applies itself by its left hand slot edge against the axle 52. When the bar 41 is now lifted at the beginning of the stroke of the machine, its right hand ear 55, encountering the downwardly extending stud 64 of the reversing member 43 forces this stud upwardly and thereby turns the member 43 and together with it the register 10 in such a manner that it returns into the positive position.

If now a new subtraction, in which the register 10 has been moved into a negative position causes a value below zero to be adjusted, then an operation involving a fugitive "one" occurs which shifts the rack 20 upwards by one tooth, carrying along in this movement the setting bail 2 by its rear lip 19 thus lifting also the balance-setting lever 1 by its stud 6. Since, as described above, the negative position of the register 10 occurring during subtraction, brings about a counter-clockwise oscillation of the balance-setting lever 1 and its extension 17 moves underneath the tongue 23 of the balance setting dics 3, these two parts engage each other during the upward movement of the lever 1. In consequence of this movement the balance-setting disc 3 is now oscillated in counter-clockwise direction and its long arm 21 now extends across the path of the rearwardly bent part 32 of the upper arm 28 of the lever 5, if this lever is being oscillated. Therefore, if the totalling or sub-totalling key (not shown) is now pressed and the totalling slide 36 or the sub-totalling slide 37 is shifted towards the right, it is blocked after a short movement by the member 33 fixed to the lower end of the balance transmitting lever 5 which is stopped by meeting the arm 21 of the balance-setting disc 3. This short movement of the slides 36 and 37 is limited to such an extent that the projection 46 of the setting bail 39 enters the gap to the left of the tooth 47 of the index slide 35. The bail 39 therefore is in the same position as shown in Fig. 4, but cannot have any effect on the register 10 since the latter is already in the negative position.

If positive digits are introduced into the register without the total value registered by the register becoming positive again, the register 10 moves over into the positive position, but no fugitive "one" is introduced and consequently no displacement of the balance-setting disc 3 occurs. Therefore, in totalling or sub-totalling operations the register is once more set for "minus" in the manner hereabove described. Of course no displacement of the balance-setting disc occurs when introducing into the register further negative amounts.

If, however, a positive amount is added of a value such that the total value registered by the register 10, the rack 20 of which was returned after the preceding introduction of the fugitive "one" into the normal position, passes through zero and above zero, a new fugitive "one" is introduced. Since, owing to the preceding addition, the register at this moment is set for "plus," the balance-setting lever 1 has its top arm 8 applied against the stud 9 of the register 10 and therefore, when the lever 1 rises, its left hand extension 16 meets the lip 24 of the balance-setting disc 3, turning this latter in clockwise direction so that its right hand arm 21 is moved out of reach of the end 32 of the upper arm 28 of the balance transmitting lever 5. Therefore, if the total or sub-total is now ascertained, the totalling or sub-totalling slides 36 and 37 can again be shifted longitudinally through the entire distance and the setting bail 39 will set the register 10 for "plus." As long as the total value registered by the register remains positive, the totalling or sub-totalling operation will always occur in the same manner.

The description given hereabove of the mechanism according to the invention has shown that although the mechanism is of simple design, the register, when the balance is taken, will always be moved into a position corresponding to its value, the operator not being required to reflect or to go through an idle operation.

The invention is not limited to the details of construction represented in the example here shown and described. The balance-setting lever might consist of several parts and might act through differently designed members on the device for shifting the register from "plus" to "minus." This device might also be replaced by some other device. On the other hand, the device for setting the register from "plus" to "minus" might also be used in operations other than balancing.

The mechanism according to the invention distinguishes particularly over the mechanism of the prior art by the simplicity and concentrated combination of its parts.

Obviously, the mechanism according to the invention is not limited to use in ten-key adding machines, but may form part of any type of calculating business machines, including bookkeeping machines, calculating machines with a full keyboard, machines for performing the four primary calculations and so on.

We claim:

1. A calculating machine adapted for accumulating positive and negative items and having facilities for striking the balance of the accumulated items, comprising in combination: an accumulator having a first position for accumulating positive items and a second position for accumulating negative items, said accumulator being arranged for performing an operation involving the transfer of a fugitive "one" whenever the balance of the items accumulated by said accumulator changes the sign thereof, and means for adjusting said accumulator to the first or second positions thereof, respectively, when a positive or a negative item is to be accumulated or a corresponding balance is to be derived therefrom, means for controlling a balance operation of said accumulator, a first member forming part of said balance operation means, a second member forming part of said balance operation means, a pivotal connection between said first member and said second member, means for imparting to said first member a rocking adjustment about said pivotal connection when said accumulator is brought from its first position to its second position, and vice versa, and means for imparting to said second member a displacement when said accumulator performs an operation involving entry of a fugitive "one" whereby said pivotal connection is displaced so that said first member is moved bodily independently of its rocking motion, a third member positionable by said first member in response to its rocking adjustment and bodily movement, and means controlled by said third member and cooperating with said adjusting means during a balance operation for causing said accumulator to be adjusted in accordance with the positive or negative character of the balance thereon.

2. The machine of claim 1, in which said first member includes an upper portion and a lower portion, said portions being connected to each other, a pin rigidly connected to said accumulator and being in engagement with said upper portion of the first member, resilient means so connected to said lower portion of the first member as to urge said upper portion of the first member into engagement with said pin, said lower portion of the first member having an aperture, and a stationary pin so arranged in the aperture of said lower portion of the first member as to come into contact with one of the sides of the aperture of said lower portion of the first member so as to limit the rocking motions thereof.

3. The machine of claim 2 in which said third member is pivoted to said staitonary pin so as to oscillate about the same between two extreme positions, hook-shaped extensions arranged on the sides of said lower portion of said first member, abutments arranged on said third member to alternately come into engagement with said hook-shaped extensions, when said first member is subjected to a displacement movement, so as to oscillate said third member about said stationary pin, and yieldable means for locking said third member in its extreme positions.

4. The machine of claim 3, in which is provided a lever having two ends and a stationary pivot arranged between said two ends, and actuating means for actuating said balance striking means, one of the two ends of said lever engaging said actuating means, the other end engaging said third member in one of its extreme positions so as to limit the motion of said lever.

5. The machine of claim 4 wherein said actuating means is formed by a first element being arranged to be operated when the total balance of the recorded items is to be struck, and a second element being arranged to be operated when a sub-total balance of the recorded items is to be struck, said two elements engaging an end of said lever so as to permit a limited oscillation thereof about the stationary pivot of the lever, when one of said elements is operated, the other end of said lever engaging said third member in one of its extreme positions so as to limit the motion of said lever.

6. The machine of claim 5, a third element being arranged to be operated when an item is to be accumulated, means rigidly connected to the third element for coupling the same to said first and second elements so as to displace said third element, when any of said first and second elements is operated, a plurality of projections on each of said elements, said projections having rim portions respectively, joining projections on each of said elements being arranged in relatively spaced relation, a crank lever having a stationary pivot, resilient means urging one arm of said crank lever toward said elements so that said arm engages in first predetermined relative positions of said elements at least one of said rim portions of said projections and in second predetermined relative positions the spaces between two adjacent projections of each of said elements, and means connected to said crank lever for bringing said accumulator into its first position when the arm of said crank lever engages one of said rim portions of said projections, and into its second position when the arm of said crank lever engages the spaces between two adjoining projections of each one of said elements, said elements, crank lever and resilient means forming part of the means for controlling a balance operation.

7. The machine of claim 6, said means for adjusting the accumulator to the first and second positions thereof comprising a rockable bar having one end engaging the other arm of said crank lever, lifting means for lifting said bar once during every operational cycle of the machine, means adapted to be actuated by said bar for bringing said accumulator into its first position when the arm of said crank lever engages one of said rim portions of said projections, and into its second position when the arm of said crank lever engages the spaces between two adjoining projections of said elements.

8. The machine of claim 7, in which said lifting means comprises a lever linked to the rockable bar, said lever having a stationary pivot and being pivoted with one of its ends to said bar, and a main shaft forming part of the machine, a cam disc being fixed on said main shaft so engaging the other end of said lever as to lift said bar once per every operational cycle of the machine.

9. The machine of claim 7, in which the other end of the rockable bar is formed with a substantially square aperture, said accumulator adjusting means further comprising said other end of said rockable bar and a reversing member connected to said accumulator, a stationary pivot on said reversing member engaging the aperture of said bar so as to shift said reversing member once per every operational cycle of the machine, two lateral abutments arranged on said bar at opposite sides of the square aperture thereof, and a first and a second pin rigidly connected to said reversing member and being adapted to alternately engage said lateral abutments of said bar when one end thereof engaging said crank lever is actuated by the same in the position in which said one arm of said crank lever engages the spaces between two adjacent projections of each of said elements.

10. The machine of claim 7, in which resilient means connected to said rockable bar and to said lever urge one end of said bar against the other arm of said crank lever.

11. In a calculating machine, in combination, an accumulator; support means supporting said accumulator for movement between an additive position, where numbers inserted into the machine are added, and a subtractive position, where numbers inserted into the machine are subtracted; a rack operatively connected to said accumulator to be moved thereby in a predetermined direction whenever the state of the accumulator changes from positive to negative or vice versa; a stud connected to and movable with said accumulator; a lever located adjacent to said accumulator and engaging said stud, said lever having a pair of opposite projections; connecting means connecting said lever to said rack for translational movement with and relative thereto; spring means operatively connected to said lever for urging the same against said stud so that said lever occupies one position when said accumulator is in its additive position and another position when said accumulator is in its subtractive position; a blocking member turnably mounted on the machine and being located beside said lever, said blocking member having a pair of tongues spaced for selective cooperation with the projections on said lever, said projections being movable in line with one or the other of said tongues depending on the displacement of said stud, so that when said lever moves in translation one of said projections engages one of said tongues to move said blocking member toward or away from a predetermined blocking position.

References Cited in the file of this patent

UNITED STATES PATENTS

| | | |
|---|---|---|
| 2,118,588 | Butler | May 24, 1938 |
| 2,186,265 | Norton | Jan. 9, 1940 |
| 2,203,336 | Landsiedel | June 4, 1940 |
| 2,243,150 | Ewald et al. | May 27, 1941 |